US010235393B2

(12) United States Patent
Yang et al.

(10) Patent No.: US 10,235,393 B2
(45) Date of Patent: Mar. 19, 2019

(54) NORMALIZATION RULE GENERATION AND IMPLEMENTATION SYSTEMS AND METHODS

(71) Applicant: Wal-Mart Stores, Inc., Bentonville, AR (US)

(72) Inventors: Fan Yang, Redwood City, CA (US); Narasimhan Rampalli, Los Altos, CA (US); Jun Xie, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 414 days.

(21) Appl. No.: 14/447,454

(22) Filed: Jul. 30, 2014

(65) Prior Publication Data

US 2016/0034500 A1 Feb. 4, 2016

(51) Int. Cl.
*G06F 17/30* (2006.01)

(52) U.S. Cl.
CPC .............. *G06F 17/30292* (2013.01)

(58) Field of Classification Search
CPC .......... G06F 17/2827; G06F 17/30528; G06F 17/30622; G06F 17/3048; G06F 17/30292
See application file for complete search history.

(56) References Cited

U.S. PATENT DOCUMENTS

| 7,904,462 B1 * | 3/2011 | Thirumalai | G06Q 30/06 |
| | | | 707/749 |
| 2010/0076979 A1 * | 3/2010 | Wang | G06F 17/30864 |
| | | | 707/740 |
| 2011/0093467 A1 * | 4/2011 | Sharp | G06F 17/2264 |
| | | | 707/741 |
| 2012/0198073 A1 * | 8/2012 | Srikanth | G06F 9/5027 |
| | | | 709/226 |
| 2013/0304607 A1 * | 11/2013 | Costa | G06Q 30/0631 |
| | | | 705/26.7 |
| 2014/0040182 A1 * | 2/2014 | Gilder | G06F 17/30578 |
| | | | 707/602 |
| 2014/0258310 A1 * | 9/2014 | Wong | G01C 21/20 |
| | | | 707/749 |
| 2014/0279078 A1 * | 9/2014 | Nukala | G06Q 30/0243 |
| | | | 705/14.73 |
| 2014/0279257 A1 * | 9/2014 | Fine | G06Q 30/0625 |
| | | | 705/26.62 |
| 2015/0286747 A1 * | 10/2015 | Anastasakos | G06F 17/30917 |
| | | | 707/776 |

* cited by examiner

*Primary Examiner* — Mariela Reyes
*Assistant Examiner* — Courtney Harmon
(74) *Attorney, Agent, or Firm* — Bryan Cave Leighton Paisner LLP

(57) ABSTRACT

Product records having attributes according to various schema are normalized such that the attributes thereof conform to a canonical schema. Attributes for large numbers of product records are normalized according to a map-reduce framework in which mappers are defined but no reducers. Rules are implemented by a rule engine that is instantiated one time per VM of the map-reduce framework. Likewise, each rule may be implemented by only one object instance per rule engine instance. Generation of rules by analysts may be facilitated by defining an attribute hierarchy. A rule defined for a parent attribute may be presented as a default rule for a child attribute and either accepted or revised. Attributes may be clusters and proposed rules generated. Proposed rules may then be accepted or rejected by an analyst.

19 Claims, 6 Drawing Sheets

NORMALIZATION RULE GENERATION AND IMPLEMENTATION SYSTEMS AND METHODS

BACKGROUND

Field of the Invention

This invention relates to systems and methods for normalizing attributes of product records including attributes according to a plurality of schema.

Background of the Invention

Some retailers offer a marketplace allowing many third-party vendors to sell their products on Walmart.com. Sellers provide product information to Wal-Mart such as product category and product attributes. However, attributes provided by different sellers vary considerably. For example, for the attribute TV Screen Size=40", there exist many variations from seller provided data such as screen size=40 inch, TV Size=40", TV screen size=40 inches etc. To facilitate searching and comparison all these variations may advantageously be normalized to a single form, such as TV Screen Size=40." For a market place of 7 million products including, for example, twenty attributes, normalization requires evaluating 140 million attributes.

The systems and methods disclosed herein provide an improved approach for providing normalizing product attributes.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
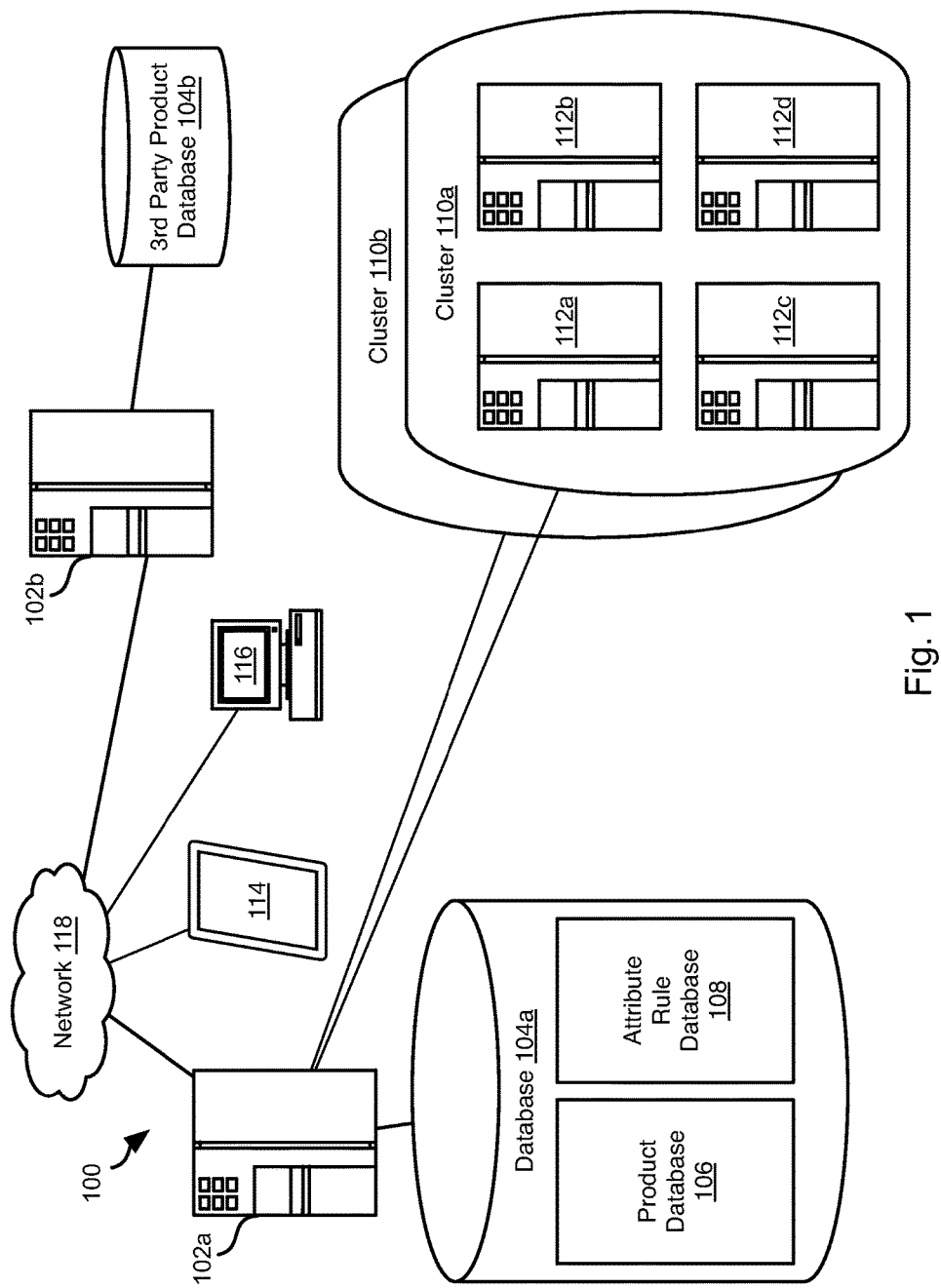
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, the methods disclosed herein may be implemented using the illustrated network environment 100. For example, a server system 102a may response to queries from users. The server system 102a may operate exclusively as a search engine or may also function as an ecommerce webserver and point of sale and searches may be searches of product records received within an ecommerce website.

The server system 102 may host or access a database 104a to facilitate responding to queries. For example, the server system 102a may host or access a product database 106 including a plurality of product records. The product records may include a plurality of attributes. The attributes may be according to a canonical format such that each product having the same attribute references the attribute in the same way. For example, size may be expressed as "inch," "in" or ". In the product database 106, attributes may refer to size using only one of these possible formats. Likewise, other attributes that correspond to one another may all be referred to using a common label. An attribute may refer to a class of values that may describe a product. Accordingly, an attribute may include both a label or text and a magnitude or value, e.g. a <label><value> pair. In some embodiments, both the value format and label format may be defined according to a canonical format.

The database 104a may further include an attribute rule database that defines rules for normalizing attributes according to one or more non-canonical schema to conform to the canonical schema. For example, a server system 102b or other computer system (e.g. an individual user selling products in a marketplace hosted by the server system 102a) may include a database of third party product records 104b according to a non-canonical schema. These third party product records may be processed according to the rule database 108 and stored in the product database 106 or some other database. The server system 102a may then use the product database 106 to respond to user requests for product information. For example, upon request, one or more product records may be presented in a web interface for viewing by a user and for invoking purchase of a product corresponding to the one or more products.

The methods disclosed herein may advantageously be implemented using a data processing framework for processing large data sets, such as a Map-Reduce framework according to HADOOP, or some other "big data" processing architecture. Accordingly, one or more clusters 110a, 110b each including one or more computer systems 112a-112d may be accessed by the server system 102a in order to implement application of rules to third party product records.

A user monitoring or invoking the processing of third party product records may interface with the server system 102a or clusters 110a, 110b by means of a mobile computer 114, such as a tablet computer, smart phone, wearable computing device, or the like. Likewise, a user may monitor or invoke the processing of third party product records by interfacing with the server system 102a or clusters 110a, 110b by means of a laptop or desktop computer 116. In a like manner, a user submitting queries of the product database, viewing product records, and purchasing products may interface with the server system 102a by means of a mobile computer 114 or laptop or desktop computer 116.

The server system 102a and computers 114, 116 may communicate with one another by means of a network 118 such as the Internet, a local area network (LAN), wide area network (WAN), or some other network connection. The mobile devices and computers 114 may communicate with the server system 102a by means of any wired or wireless protocol.

Figure 2:
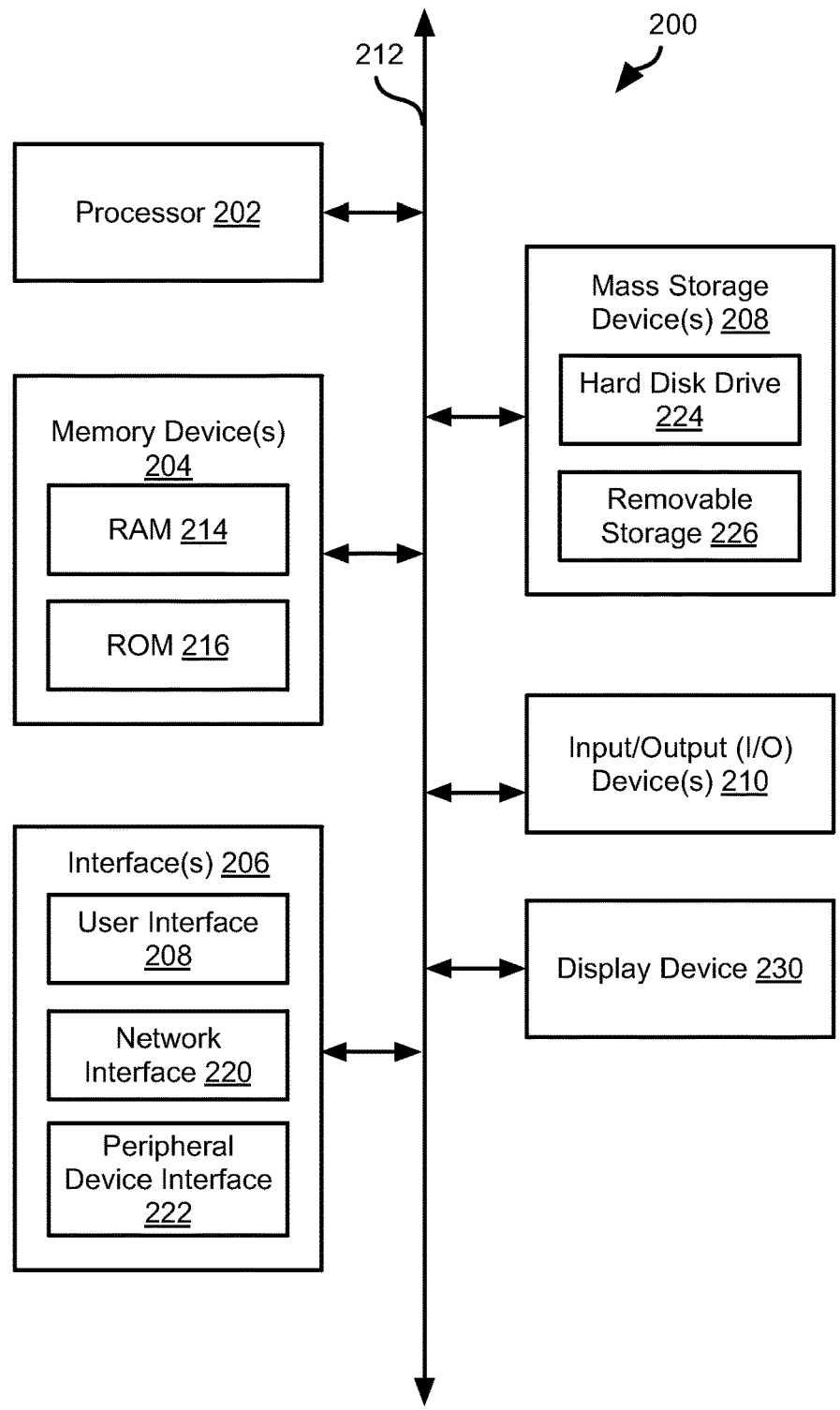
FIG. 2 is schematic block diagram of a computer system suitable for implementing methods in accordance with embodiments of the invention.

FIG. 2 is a block diagram illustrating an example computing device 200. Computing device 200 may be used to perform various procedures, such as those discussed herein. A server system 102a, 102b, cluster computer 112a-112d, mobile computer 112, and laptop or desktop computer 114 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like. A server system 102a, 102b may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
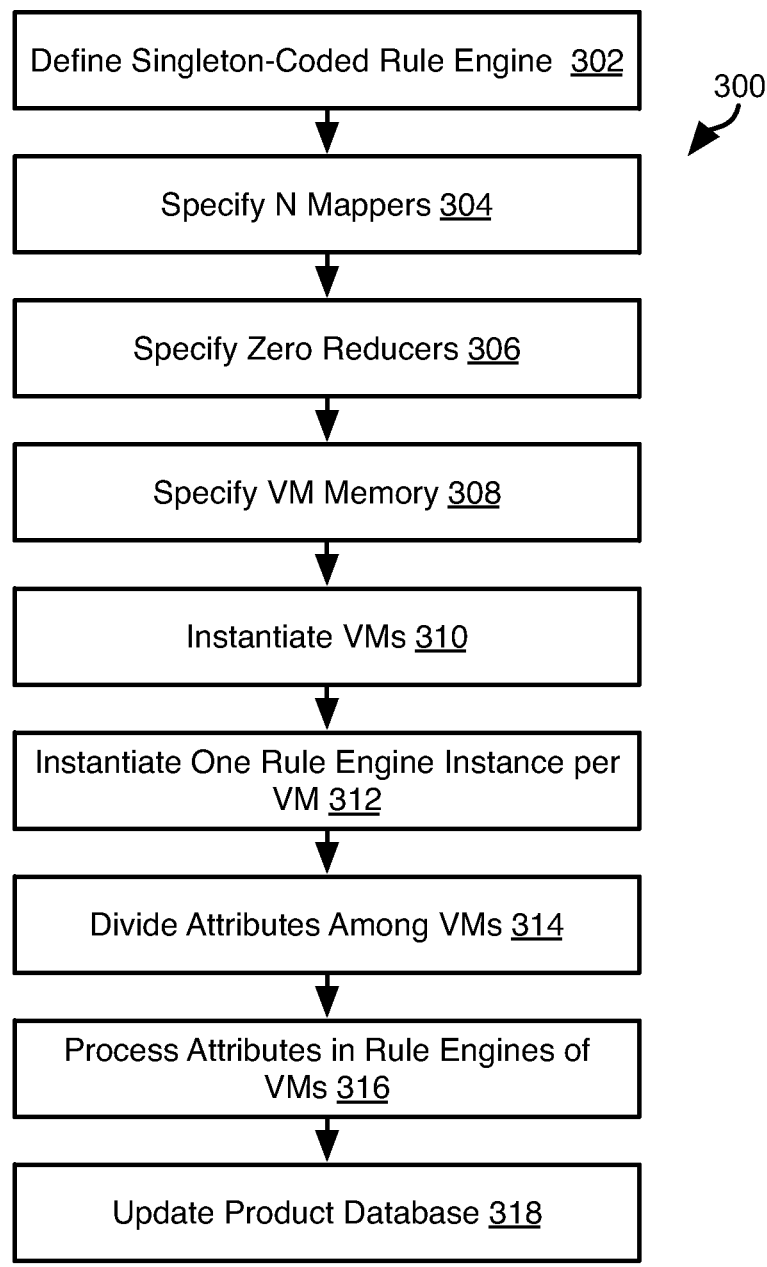
FIG. 3 is a process flow diagram of a method for normalizing large number of attributes in accordance with an embodiment of the present invention.

Referring to FIG. 3, the illustrated method 300 may be used to process large amount of attributes for a large number of product records in order to generate updated product records having normalized attributes.

The method 300 may include defining 302 a Singleton-coded rule engine. A Singleton coded rules engine may be embodied as a rules engine such that each instance of the rules engine includes only one instance of each type of rule application object of a plurality of rule application object. Specifically, each normalization rule may be implemented by only one rule application object, though a rule application object may implement multiple normalization rules, such as normalization rules corresponding to a node of a product hierarchy and its descendants. The collection of rule application objects may be referred to as a rule engine. Requiring that only one instance of a rule application object be instantiated per instance of the rule engine reduces the amount of memory required to store the many rules required to implement the rule engine.

A map-reduce architecture may further be configured with respect to the one or more clusters 110a, 110b. In particular, the parameters by which jobs are executed in a map-reduce framework may be defined according to steps 304-312. For example, in a typical implantation of a map-reduce framework, a plurality of mappers are defined for the map phase and a plurality of reducers are defined for the reduce phase. In the illustrated embodiment, a N mappers may be specified 304 in configuration parameters, N being a large number on the order of hundreds and thousands. In contrast with typical implementations, the method 300 may include specifying 306 zero reducers.

An amount of memory may also be specified 308 for each of a plurality of virtual machines (VM) in which the mappers and rule application objects are implemented. In particular, the amount of memory available to any one mapper may be limited to 2 GB or some other value to ensure that a rule engine implemented by the mappers runs efficiently.

The method 300 may include instantiating a plurality of virtual machines (VMs), such as one or more VMs for each of the computer systems 112a-112d of the clusters 110a, 110b, or a portion thereof. In at least a portion of the VMs, one instance of the rule engine may be instantiated 312 within each VM. Instantiating a rule engine on a VM may include commencing execution of the rule engine, provisioning resources for the rule engine, publishing a port or other access information for the rule engine, and the other activities known in the art for initiating a service.

The method 300 may further include dividing 314 attributes to be normalized among the plurality of VMs and rule engines executing thereon. For example, a plurality of products records P may each have a plurality of attributes. Product records may be processed individually such that the attributes are input to a rule engine for normalization. Alternatively, attributes may be divided up among rule engines without regard to product records. For example, attributes of the plurality of product records may be placed in a pool from which allocations of attributes are allocated to specific rule engines. Attributes may be allocated to each VM according to some relationship among the attributes of an allocation. For example, attributes may be allocated such that all attributes for product records belonging to a particular category in a hierarchy may be allocated to a particular VM. Alternatively, the attributes for product records belonging to a particular category may be allocated to a subset of the VMs.

Steps 302-314 may be performed by the server system 102a or some other management module executing on a cluster 110a, 110b or some other computer system controlling operation of the clusters 110a, 110b. The systems and methods by which allocation of attributes as determined at step 314 are distributed to clusters 110a, 110b and responses received may be according to any distributed processing architecture known in the art.

The attributes may be processed within the rule engines to normalize the attributes to conform to the canonical schema. Processing of an attribute may proceed generally as follows: 1) a category in a product hierarchy of the product record to which the attribute belongs is identified 2) normalization rules for that category are evaluated 3) a rule that matches the attribute is identified 4) the rule is applied to the attribute such that a normalized attribute is output that corresponds to the attribute according to the rule logic. These steps may be performed by the rule engine and may be performed by a rule application object for the rule identified at 2) and 3).

The normalized attributes as processed at step 316 may then be aggregated to corresponding product records and product records in the product record data base may be updated 318. Specifically, normalized attributes may be mapped to the product records with which the input attribute was associated. A product record having the normalized attributes may then be stored. The product record may include a product record identifier. Attributes for a product record may be processed individually in associating with an original product record identifier. A normalized attribute may likewise be associated with the same product record identifier as the input identifier for which the normalized attribute was generated according to application of a normalization rule. Accordingly, an updated product record may include the normalized attributes associated with the product record identifier of the product record. In some embodiments, the input attributes (non-normalized) may also be stored in the product record such that both normalized and non-normalized are stored in the product record.

Figure 4:
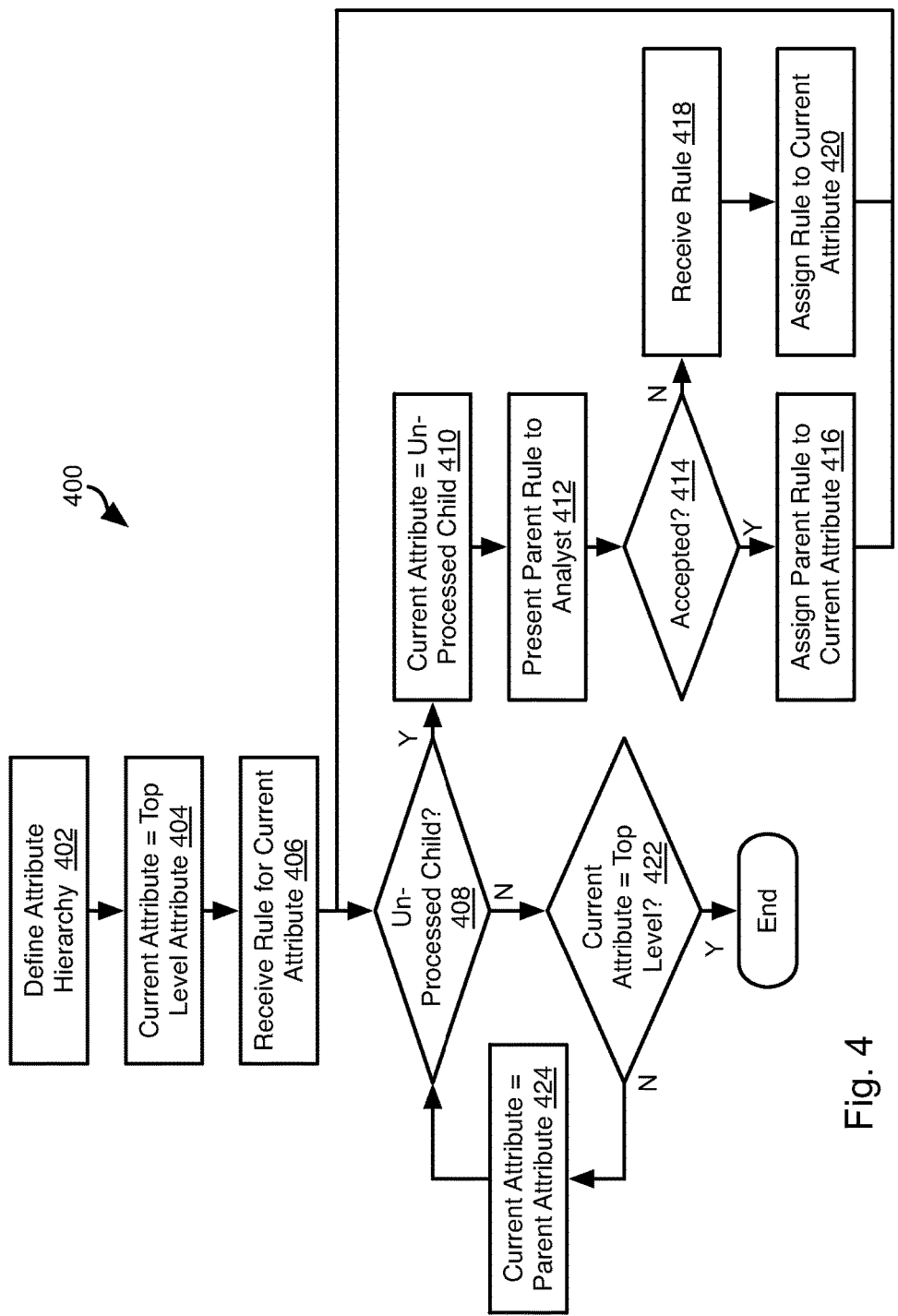
FIG. 4 is a process flow diagram of a method for generating normalization rules in accordance with an embodiment of the present invention.

Referring to FIG. 4, the illustrated method 400 may be used to facilitate the creation of rules for application by the rules engines according to the method 300 or some other approach. In particular, the method 400 may be used to facilitate defining rules by an analyst for normalizing non-normalized attributes into normalized attributes. The method 400 may be performed by the server system 102a with an interface on some other computing device 114, 116. Alternatively, the method 400 may be performed locally on a computing device 114, 116.

The method 400 may include defining 402 an attribute hierarchy. The attribute hierarchy may be independent from the product hierarchy. In particular, a parent attribute may have one or more child attributes that are more specific versions or alternatives of the parent attribute. The attribute hierarchy may be defined for canonical attributes according to the canonical schema. For example, a root attribute of the hierarchy may be "size." A child of "size" may be "screen size" and a child of "screen size" may be "TV screen size" for a television or "view finder screen size" for a digital camera. Accordingly, a plurality of attribute trees may be defined each with a root attribute having one or more child attributes that may or may not have child attributes of their own. The following steps of the method 400 may be performed for each attribute tree.

At step 404, the current attribute to be processed according to the foregoing steps may be set to be the top level attribute of the attribute tree being processed. At step 406 a normalization rule is received for the current attribute. For example, the normalization rule may specify that for a plurality of non-canonical ways of expressing the top level attribute, a single canonical way will be substituted. The rule may be in the form of a regular expression (or some other textual pattern matching language) such as [input expression]→[replacement expression], where input expression is a regular expression that matches one or more of the non-canonical ways of expressing the top level attribute. The rule may be automatically generated and then revised by an analyst, such as according to the method 700 of FIG. 7, described below.

The method 400 may include determining 408 whether the current attribute has any un-processed child attributes. Un-processed child attributes may be child attributes for which a normalization rule has not been generated according to the following steps of the method 400.

If the current attribute does have unprocessed child attributes, then the current attribute may be set 410 to be one of the unprocessed child attributes and the parent rule of the current attribute may be presented 412 to an analyst. Additional information may also be presented to the analyst, such as non-normalized attributes corresponding to the child attribute. The additional information may include a proposed rule for the child attribute such as a proposed rule generated according to the method 700 of FIG. 7.

In many instances, a normalization rule for a parent attribute of the current attribute will be sufficient to cover normalization of non-normalized attributes corresponding to the current attribute. Accordingly, the method 400 may include presenting an interface receive form a user 1) acceptance of the parent rule as the normalization rule for the current attribute, 2) a revision to the parent rule to generate a revised rule for the current attribute 3) receive an entirely new rule for the current attribute. The accepted, revised, or new rule may then be used as the rule for the child attribute.

Accordingly, the method 400 may include determining 414 whether a user has instructed acceptance of the parent rule for the current attribute. If so, then the parent rule is assigned 416 to the current attribute, i.e. stored in a rule database as the rule for normalizing non-normalized attributes corresponding to the current attribute. If the parent rule is not accepted, then the method 400 may include receiving 418 a substitute rule, either in the form of revisions to the parent rule or input of a new rule. For example, an editing interface may be displayed in which the rule may be input to the user and the additional information noted above maybe displayed to facilitate an analyst in crafting a rule. Upon receiving 418 the new rule from the interface, the new rule may be assigned 420 to the current attribute.

If the current attribute is found 408 to have un-processed children, then steps 410-420 may be performed with respect to one of the un-processed children. If not, the method 400 may include determining 422 whether the current attribute is the top level attribute for the attribute. If so, then the entire tree has been processed and the method 400 may end. If not, then the current attribute may be set to the parent attribute of the current attribute and steps 408-420 may be repeated with respect to the current attribute.

Applicant notes that the method 400 illustrates one approach for traversing a tree in a recursive manner whereby each attribute and its descendants are processed in a recursive manner. However, other approaches for traversing an attribute tree may also be performed. For example, steps 410-420 may be performed for each attribute at a current level of the attribute tree prior to processing the attributes at a lower level of the attribute tree until all levels of the tree have been processed.

Figure 5:
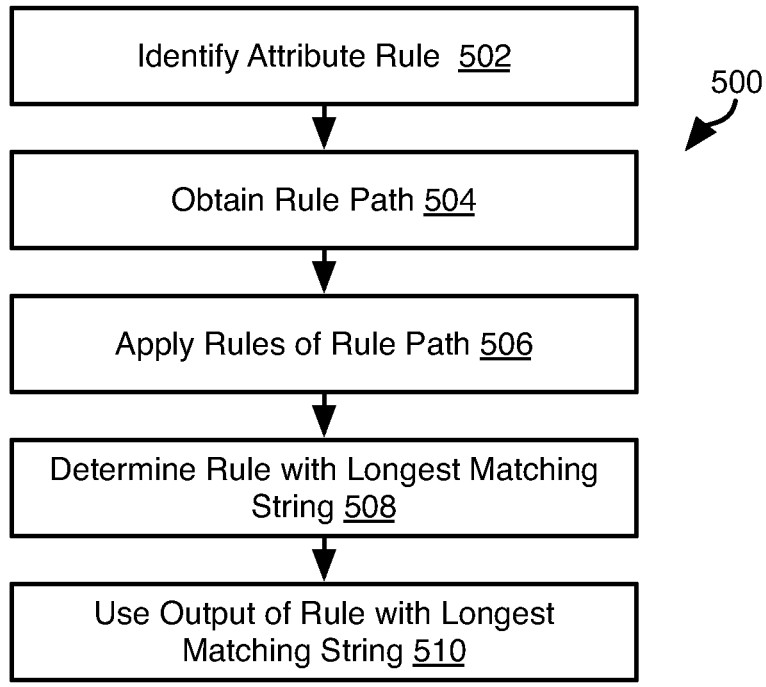
FIG. 5 is a process flow diagram of a method for applying rules according to an attribute hierarchy in accordance with an embodiment of the present invention.

Referring to FIG. 5, in some embodiments, for given attribute, rules defined for the attribute and for one or more ancestors of the attribute in the attribute tree of which the attribute is a node may all be used when normalizing non-normalized attributes corresponding to the attribute. For example, the illustrated method 5 may be used by a rule application object and/or rule engine. The method 500 may be executed with respect to an input non-canonical attribute (hereinafter the "input attribute").

The method 500 may include identifying 502 an attribute rule. For example, the input attribute may have a product identifier associated therewith, i.e. an identifier of the product record from which the input attribute was extracted. Accordingly, rules that are associated with the same product identifier may be applied. Alternatively, all rules may be applied to each attribute, in which case the method 500 may be executed with respect to each rule applied to the input attribute. For example, each rule may define a matching criteria that determines whether the rule applies. Identifying 502 an attribute rule may include identifying a rule for which the input attribute meets this criteria.

For the identified rule 502 a rule path may be obtained. For example, if an attribute rule for an attribute is identified at step 502 then parent and/or child attributes in an attribute tree including the identified attribute may be determined and rules associated with each of these parent and/or child attributes may be obtained.

Of the rules in the rule path, the rule with the longest matching string may be determined. In particular, the input attribute may be a string of text, any portion of which may meet the matching criteria of some or all of the rules in the rule path. Accordingly, the rule of the rule path for which the portion of the input attribute meeting the matching criteria thereof is longer than for other rules of the rule path may be determined 508. An output defined by the rule determined at step 508 may then be used as the normalized attribute for the input attribute.

Figure 6:
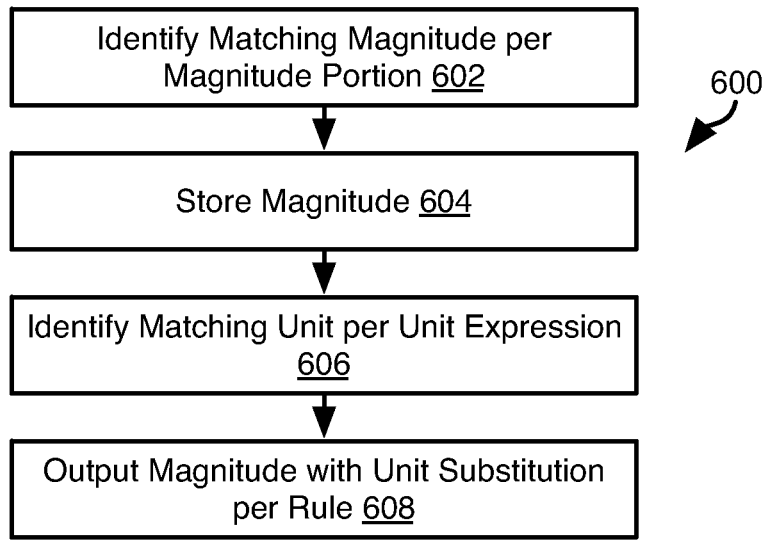
FIG. 6 is a process flow diagram of a method for normalizing attributes in accordance with an embodiment of the present invention.

Referring to FIG. 6, in some embodiments an attribute will have a <magnitude> <unit> format. For example, a "60 inch TV" may have the attribute "60 inch" with magnitude "60" and unit "inch." Accordingly, a rule may include a magnitude matching portion and a unit matching portion. The magnitude portion may define a pattern for recognizing a magnitude, such as in the form of a regular expression such as (\d{1,3}). The unit portion may define a pattern for recognizing a unit, which likewise may be a regular expression. For example, where the unit is inches, the unit portion may be the regular expression (inch|in|").

The method 600 may therefore include identifying 602 in an input attribute a magnitude matching the magnitude portion pattern and storing 604 the magnitude. Likewise, a matching unit in the input attribute satisfying the unit portion patter may be identified 606. The method 600 may then output 608 as the normalized attribute the stored magnitude and a substitute unit defined by the normalization rule.

Figure 7:
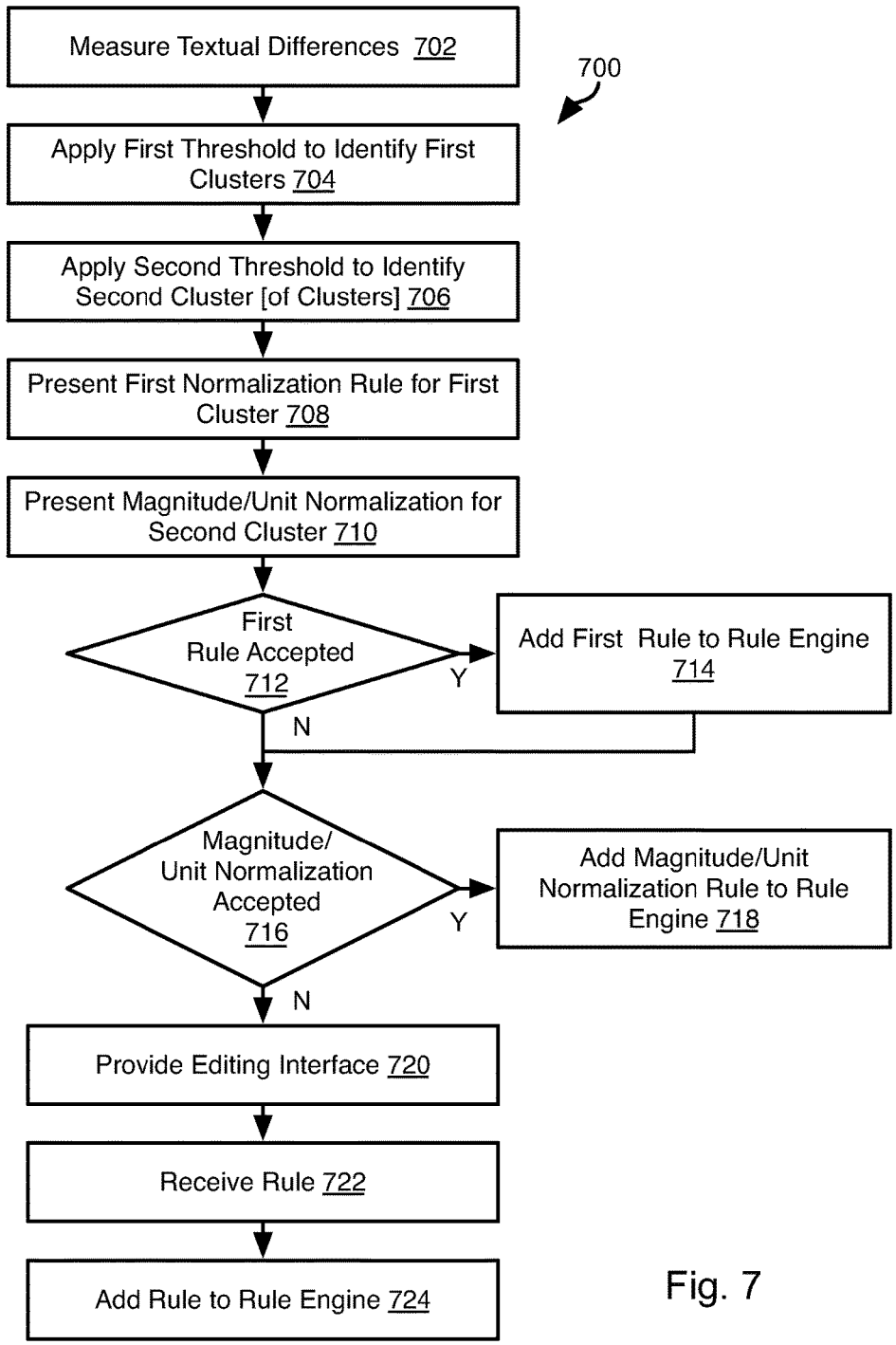
FIG. 7 is a process flow diagram of a method for generating normalization rules for clusters of non-normalized attributes in accordance with an embodiment of the present invention.

Referring to FIG. 7, the illustrated method 700 may be used to generate proposed rule in an intelligent manner. The proposed rules generated according to the method 700 may be presented in combination with a parent rule in order to provide assistance to an analyst generating rules. The method 700 may be performed by the server system 102a with an interface on some other computing device 114, 116. Alternatively, the method 700 may be performed locally on a computing device 114, 116.

The method 700 may include measuring 702 textual differences between non-canonical attributes. Measuring 702 textual differences may include measuring textual differences between attributes of product records that are related to one another, such as belonging to the same category, having the same parent category, grandparent category, or some other common ancestor in the product hierarchy. Measuring 702 textual differences may be performed according to any method known in the art. For example, a string edit distance, Jaccard distance, or some other metric or combination of metrics for measuring textual similarity may be used.

The method 700 may include applying 704 a first threshold to identify first clusters. For example a first cluster may be a group of two or more non-canonical attributes that have textual similarity scores with respect to all other members of the group higher than a first threshold. Clusters may be identified according to k-means clustering or any other clustering technique. For example, one cluster may include attributes such as "4 Watts," "4 Watt," "4 watts," or other variations of this attribute. Another example may include "CompactFlash" and "Compact Flash," or "SD-HC" and "SDHC."

In some embodiments, a second threshold condition may be applied 706 to identify second clusters. For example, the second threshold condition may identify clusters that have similar units but differing magnitude. For example, the threshold condition may simply be a lower threshold than the first threshold such that attributes are added to a cluster notwithstanding greater variation than among attributes of a first cluster. Alternatively, numerical values or other magnitude values in attributes to be compared may be treated as being similar or identical to one another notwithstanding differences in value when computing textual similarity scores. Alternatively, numerical or other magnitude values may be replaced with a common symbol or ignored and textual similarity scores computed with respect to the attributes modified in this manner.

The similarity scores may then be used to compute second clusters in the same manner as for step 704, namely identifying clusters of attributes for which each attribute of the cluster has a similarity score with respect to other attributes of the cluster greater than a second threshold, which may be the same or different from the first threshold. Again, k-means or some other clustering means may be used to identify the second clusters. In some embodiments, the first clusters may be identified without any ignoring or substitution of magnitude values as may be done when identifying the second clusters as described above.

The method 700 may further include, for each of some or all of the first clusters, presenting 708 a proposed normalization rule for the each first cluster. The proposed rule may for example, be a pattern that matches each of the attributes of the first cluster and an output that is a canonical attribute to with which all attributes of the first cluster will be substituted upon application of the rules.

In some embodiments, the canonical attribute that will be output by the rule may be selected from among the attributes of the first cluster. For example, one or more "title case rules" may be used to transform one of the attributes of the first cluster. Specifically title case rules may be rules may be rules that define general formatting rules and the selected attribute of the first cluster may be transformed to conform to them.

Presenting 708 the proposed normalization rule may include presenting such information as a list of the attributes of the first cluster, the output of the rule, a regular expression matching the attributes of the first cluster, and like information. Presenting 708 the proposed rule may include presenting the rule in an interface defining elements for receiving revisions to, or replacements of, the proposed rule and receiving an indication of user acceptance of the proposed rule. Other data may also be presented with the proposed rule such as a confidence score indicating how likely the attributes of the first cluster are to be different forms of the same attribute. The confidence score may be based on the similarity scores. In some embodiments, the number of attributes in the first or second cluster may also be presented with each rule.

The method 700 may further include presenting 710 a magnitude/unit normalization rule. The magnitude/unit normalization rule may include a pattern that covers all of the attributes of the second clusters. For example, a magnitude pattern may be generated that covers some or all magnitudes (e.g. numerical or other magnitude value) of the attributes of the second cluster. Likewise, a unit pattern may be generated that covers some or all of non-magnitude portions of the attributes of the second cluster.

Presenting 708, 710 the proposed first rule and magnitude/unit normalization rule may include presenting an interface including a list of attributes of the cluster used to generate the rule, the output of the rule, a regular expression matching the attributes of the cluster used to generate the rule, one or more interface elements to invoke editing of some or all of the output, matching regular expression, or attributes of the cluster used to generate the rule. For example, the attributes of the cluster, regular expression, and output may be presented in an editable text field configured to receive inputs (i.e. textual deletions and additions).

The method 700 may further include determining 712 whether the first proposed rule has been accepted and, if so, the first proposed rule is added 714 to the rule engine definition. The method 700 may further include determining 716 whether the proposed magnitude/unit normalization rule has been accepted and, if so, adding 718 the magnitude/unit normalization rule to the rule engine.

If one or both of the first proposed rule and magnitude/unit normalization rule are not accepted, or regardless of acceptance in some embodiments, an editing interface may be provided 720 and a rule may be received 722 through this interface. The rule may be received as revisions to a proposed rule or as a completely new rule. The received rule may then be added to the rules implemented by the rule engine. In some embodiments, revisions to a rule may be accomplished by receiving a user instruction to remove one or more attributes from the first or second cluster and, in response, regenerating the proposed rule such that it covers only those attributes remaining in the first or second clusters after their removal. Additionally or alternatively the additions to the attributes of the first or second cluster may be received and a new rule generated that covers the augmented first or second cluster.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for attribute normalization, the method comprising:
   evaluating a plurality of product records having a plurality of attributes defined according to a plurality of different schema, the plurality of product records being associated with a plurality of products;
   determining a first portion of the plurality of attributes to comprise multiple canonical attributes wherein each product record of the plurality of product records associated with a product of the plurality of products having a canonical attribute of the multiple canonical attributes references the canonical attribute in a same format;
   determining a second portion of the plurality of attributes to comprise multiple non-canonical attributes wherein each product record of the plurality of products records associated with a product of the plurality of products having a non-canonical attribute of the multiple non-canonical attributes references the non-canonical attribute in a different format;
   measuring textual differences between each non-canonical attribute of the multiple non-canonical attributes of the plurality of attributes of the plurality of product records to determine textual similarity scores for the multiple non-canonical attributes;
   identifying a first cluster of attributes of the multiple non-canonical attributes of the plurality of attributes of the plurality of product records, each attribute of the first cluster of attributes of the plurality of attributes of the plurality of product records corresponding to a different schema of the plurality of different schema and having a textual similarity score exceeding a first threshold;
   identifying a normalized attribute for the first cluster of attributes of the multiple non-canonical attributes of the plurality of attributes of the plurality of product records;
   generating a first proposed rule matching the first cluster of attributes of the multiple non-canonical attributes of the plurality of attributes of the plurality of product records to the normalized attribute;
   defining a rule engine programmed to create a rule engine instance implementing a single instance of each of a plurality of rule application objects, each of the plurality of rule application objects implementing normalization rules comprising the first proposed rule;
   configuring a cluster of computer systems to implement a map-reduce framework comprising one or more N mapper instances and one or more zero reducer instances;
   instantiating a plurality of virtual machines on the cluster of computer systems;
   instantiating a separate and different rule engine instance on each virtual machine of the plurality of virtual machines;
   specifying an amount of memory for each virtual machine of the plurality of virtual machines, the amount of memory based upon a number of the one or more N mapper instances, a number of the one or more zero reducer instances, and the separate and different rule engine instance instantiated on each virtual machine of the plurality of virtual machines;
   allocating to each separate and different rule engine instance instantiated on each virtual machine of the plurality of virtual machines an allocation of the plurality of attributes of the plurality of product records;
   processing in each separate and different rule engine instance instantiated on each virtual machine of the plurality of virtual machines the allocation of the plurality of attributes of the plurality of product records allocated thereto to transform the allocation of the plurality of attributes of the plurality of product records to normalized attributes of a canonical schema by, for each attribute of the plurality of attributes of the allocation:
      identifying a product record of the plurality of product records corresponding to each attribute of the allocation of the plurality of attributes of the plurality of product records and having a categorization associated therewith;
      identifying an identified rule application object of the plurality of rule application objects for a rule having the categorization associated therewith by identifying a correct rule path corresponding to the rule having the categorization associated therewith, the correct rule path having a longest string matching the plurality of attributes of the plurality of products; and
      processing each attribute of the allocation of the plurality of attributes of the plurality of product records by the identified rule application object of the plurality of rule application objects; and
   storing updated records for the plurality of product records comprising the normalized attributes and non-normalized attributes.

2. The method of claim 1, wherein each rule application object of the plurality of rule application objects implements a regular expression.

3. The method of claim 2, wherein the regular expression comprises a magnitude-matching portion and a unit matching portion.

4. The method of claim 3, wherein the identified rule application object of the plurality of rule application objects is programmed to:

identify and store a magnitude pattern in an input according to the magnitude-matching portion;
identify a unit pattern in the input according to the unit matching portion; and
produce an output comprising the magnitude pattern and a normalized unit.

5. The method of claim 1, wherein processing in each separate and different rule engine instance instantiated on each virtual machine of the plurality of virtual machines the allocation of the plurality of attributes of the plurality of product records allocated thereto to transform the allocation of the plurality of attributes of the plurality of product records to the normalized attributes of the canonical schema is performed in parallel.

6. The method of claim 1, further comprising:
receiving a query from a user computer for a requested product record of the plurality of product records; and
in response to receiving the query, returning to the user computer an updated product record of the updated records corresponding to the requested product record of the plurality of product records.

7. The method of claim 1, wherein each attribute of the plurality of attributes is allocated to only one virtual machine of the plurality of virtual machines, and wherein each separate and different rule engine instance is allocated to only one virtual machine of the plurality of virtual machines.

8. A method for generating normalization rules comprising, by a computer system:
defining an attribute hierarchy comprising a plurality of attribute nodes descended from a top-level attribute, each attribute node of the plurality of attribute nodes being at least one of:
a child attribute; or
a parent attribute to an other attribute node of the plurality of attribute nodes;
defining a normalization rule for the top-level attribute;
starting with a child of the top-level attribute as a current attribute performing:
(a) outputting the current attribute to a display device with an interface for receiving a rule;
(b) receiving designation of a designated rule in the interface, the designated rule being at least one of:
a normalization rule defined for a parent attribute of the current attribute;
a revised version of the normalization rule for the parent attribute of the current attribute; or
a substitute rule in the interface;
(c) storing the designated rule as the normalization rule for the parent attribute of the current attribute; and
(d) repeating (a) through (c) for one or more sibling attributes of the current attribute and one or more child attributes of the current attribute in place of the current attribute;
evaluating a plurality of product records having a plurality of attributes defined according to a plurality of different schema, the plurality of product records being associated with a plurality of products;
determining a first portion of the plurality of attributes to comprise multiple canonical attributes wherein each product record of the plurality of product records associated with a product of the plurality of products having a canonical attribute of the multiple canonical attributes references the canonical attribute in a same format;
determining a second portion of the plurality of attributes to comprise multiple non-canonical attributes wherein each product record of the plurality of products records associated with a product of the plurality of products having a non-canonical attribute of the multiple non-canonical attributes references the non-canonical attribute in a different format;
measuring textual differences between each non-canonical attribute of the multiple non-canonical attributes of the plurality of attributes of the plurality of product records to determine textual similarity scores for the multiple non-canonical attributes;
identifying a first cluster of attributes of the multiple non-canonical attributes of the plurality of attributes of the plurality of product records, each attribute of the first cluster of attributes of the plurality of attributes of the plurality of product records corresponding to a different schema of the plurality of different schema and having a textual similarity score exceeding a first threshold;
identifying a normalized attribute for the first cluster of attributes of the multiple non-canonical attributes of the plurality of attributes of the plurality of product records;
generating a first proposed rule matching the first cluster of attributes of the multiple non-canonical attributes of the plurality of attributes of the plurality of product records to the normalized attribute;
defining a rule engine programmed to create a rule engine instance implementing a single instance of each of a plurality of rule application objects, each rule application object of the plurality of rule application objects implementing at least one normalization rule generated according to (a) through (d), and each rule application object of the plurality of rule application objects implementing the first proposed rule;
configuring a cluster of computer systems to implement a map-reduce framework comprising one or more N mapper instances and one or more zero reducer instances;
instantiating a plurality of virtual machines on the cluster of computer systems;
instantiating a separate and different rule engine instance on each virtual machine of the plurality of virtual machines;
specifying an amount of memory for each virtual machine of the plurality of virtual machines, the amount of memory based upon a number of the one or more N mapper instances, a number of the one or more zero reducer instances, and the separate and different rule engine instance instantiated on each virtual machine of the plurality of virtual machines;
allocating to each separate and different rule engine instance instantiated on each virtual machine of the plurality of virtual machines an allocation of the plurality of attributes of the plurality of product records;
processing in each separate and different rule engine instance instantiated on each virtual machine of the plurality of virtual machines the allocation of the plurality of attributes of the plurality of product records allocated thereto to transform the allocation of the plurality of attributes of the plurality of product records to normalized attributes of a canonical schema by, for each attribute of the plurality of attributes of the allocation:
identifying a product record of the plurality of product records corresponding to each attribute of the allocation of the plurality of attributes of the plurality of product records and having a categorization associated therewith;
identifying an identified rule application object of the plurality of rule application objects for a rule having the categorization associated therewith by identifying a correct rule path corresponding to the rule having the categorization associated therewith, the correct rule path having a longest string matching the plurality of attributes of the plurality of products; and
processing each attribute of the allocation of the plurality of attributes of the plurality of product records by the identified rule application object of the plurality of rule application objects; and
storing updated records for the plurality of product records comprising the normalized attributes and non-normalized attributes.

9. The method of claim 8, wherein the designated rule is a regular expression.

10. The method of claim 9, wherein the regular expression comprises a magnitude-matching portion and a unit matching portion.

11. The method of claim 10, wherein the regular expression comprises instructions effective to:
identify and store a magnitude pattern in an input according to the magnitude-matching portion;
identify a unit pattern in the input according to the unit matching portion; and
produce an output comprising the magnitude pattern and a normalized unit.

12. The method of claim 8, wherein:
outputting the current attribute to the display device with the interface for receiving the rule comprises:
presenting the normalization rule for the parent attribute of the current attribute in an interface for editing the normalization rule for the parent attribute.

13. The method of claim 8, wherein each attribute of the plurality of attributes is allocated to only one virtual machine of the plurality of virtual machines, and wherein each separate and different rule engine instance is allocated to only one virtual machine of the plurality of virtual machines.

14. A method for generating normalization rules comprising, by a computer system:
evaluating a plurality of product records having a plurality of attributes defined according to a plurality of different schema, the plurality of product records being associated with a plurality of products;
determining a first portion of the plurality of attributes to comprise multiple canonical attributes wherein each product record of the plurality of product records associated with a product of the plurality of products having a canonical attribute of the multiple canonical attributes references the canonical attribute in a same format;
determining a second portion of the plurality of attributes to comprise multiple non-canonical attributes wherein each product record of the plurality of products records associated with a product of the plurality of products having a non-canonical attribute of the multiple non-canonical attributes references the non-canonical attribute in a different format;
measuring textual differences between each non-canonical attribute of the multiple non-canonical attributes of the plurality of attributes to determine textual similarity scores for the multiple non-canonical attributes;
identifying a first cluster of attributes of the multiple non-canonical attributes of the plurality of attributes, each attribute of the first cluster of attributes of the plurality of attributes corresponding to a different schema of the plurality of different schema and having a textual similarity score exceeding a first threshold;
identifying a normalized attribute for the first cluster of attributes of the multiple non-canonical attributes of the plurality of attributes;
generating a first proposed rule matching the first cluster of attributes of the multiple non-canonical attributes of the plurality of attributes to the normalized attribute;
presenting the first proposed rule in an interface on a display device;
receiving from an input device an acceptance of the first proposed rule;
in response to receiving the acceptance of the first proposed rule, normalizing the plurality of product records according to the first proposed rule to generate updated records having the normalized attribute by:
adding the first proposed rule to a plurality of normalization rules;
defining a rule engine programmed to create a rule engine instance implementing a single instance of each of a plurality of rule application objects, each rule application object implementing one of the plurality of normalization rules;
configuring a cluster of computer systems to implement a map-reduce framework comprising one or more N mapper instances and one or more zero reducer instances;
instantiating a plurality of virtual machines on the cluster of computer systems;
instantiating a separate and different rule engine instance on each virtual machine of the plurality of virtual machines;
specifying an amount of memory for each virtual machine of the plurality of virtual machines, the amount of memory based upon a number of the one or more N mapper instances, a number of the one or more zero reducer instances, and the separate and different rule engine instance instantiated on each virtual machine of the plurality of virtual machines;
receiving a plurality of product records each having a plurality of attributes, the plurality of attributes of the plurality of product records being represented according to the plurality of different schema;
allocating to each separate and different rule engine instance instantiated on each virtual machine of the plurality of virtual machines an allocation of the plurality of attributes of the plurality of product records;
processing in each separate and different rule engine instance instantiated on each virtual machine of the plurality of virtual machines the allocation of the plurality of attributes of the plurality of product records allocated thereto to transform the allocation of the plurality of attributes of the plurality of product records to normalized attributes of a canonical schema by, for each attribute of the plurality of attributes of the allocation:
identifying a product record of the plurality of product records corresponding to each attribute of the allocation of the plurality of attributes of the plurality of product records and having a categorization associated therewith;

identifying an identified rule application object of the plurality of rule application objects for a rule having the categorization associated therewith by identifying a correct rule path corresponding to the rule having the categorization associated therewith, the correct rule path having a longest string matching the plurality of attributes of the plurality of products; and processing each attribute of the allocation of the plurality of attributes of the plurality of product records by the identified rule application object of the plurality of rule application objects; and storing the updated records for the plurality of product records comprising the normalized attributes and non-normalized attributes; and storing the updated records in a searchable database.

15. The method of claim 14, further comprising:

identifying a second cluster of the first cluster of attributes of the plurality of attributes, the second cluster having attributes of the plurality of attributes comprising different magnitude portions and textually similar unit portions;

generating a second proposed rule matching the attributes of the second cluster to a magnitude/unit format;

presenting the second proposed rule in the interface on the display device;

receiving from the input device, an acceptance of the second proposed rule; and in response to receiving the acceptance of the second proposed rule, normalizing the plurality of product records such that the updated records comprise the magnitude/unit format.

16. The method of claim 15, wherein normalizing the plurality of product records such that the updated records comprise the magnitude/unit format further comprises, for each attribute of the second cluster:

identifying a magnitude portion of the each attribute of the second cluster;

identifying a unit portion of the each attribute of the second cluster; and outputting as the magnitude/unit format the magnitude portion and a normalized unit.

17. The method of claim 14, wherein identifying the first cluster of attributes of the plurality of attributes, each attribute of the first cluster of attributes of the plurality of attributes corresponding to the different schema and having the textual similarity score exceeding the first threshold comprises:

determining that the first cluster of attributes of the plurality of attributes comprise a string edit distance below a threshold amount.

18. The method of claim 14, wherein identifying the first cluster of attributes of the plurality of attributes, each attribute of the first cluster of attributes of the plurality of attributes corresponding to the different schema and having the textual similarity score exceeding the first threshold comprises:

determining that the first cluster of attributes have a Jaccard distance below a threshold amount.

19. The method of claim 14, wherein each attribute of the plurality of attributes is allocated to only one virtual machine of the plurality of virtual machines, and wherein each separate and different rule engine instance is allocated to only one virtual machine of the plurality of virtual machines.

* * * * *